United States Patent [19]

Coutant et al.

[11] Patent Number: 5,380,803
[45] Date of Patent: Jan. 10, 1995

[54] POLYETHYLENE BLENDS

[75] Inventors: William R. Coutant; Joel L. Martin, both of Bartlesville, Okla.

[73] Assignee: Phillips Petroleum Company, Bartlesville, Okla.

[21] Appl. No.: 48,630

[22] Filed: Apr. 16, 1993

Related U.S. Application Data

[63] Continuation-in-part of Ser. No. 761,603, Sep. 18, 1991, abandoned.

[51] Int. Cl.6 .................. C08L 23/06; C08L 23/08; C08L 23/16; C08L 23/18
[52] U.S. Cl. ......................... 525/240; 525/199
[58] Field of Search .......................... 525/240

[56] References Cited

U.S. PATENT DOCUMENTS

| | | | |
|---|---|---|---|
| 4,336,352 | 6/1982 | Sakurai et al. | 525/240 |
| 4,338,424 | 7/1982 | Morita et al. | 526/65 |
| 4,438,238 | 3/1984 | Fukushima et al. | 525/240 |
| 4,536,550 | 8/1985 | Mouguchi et al. | 525/240 |
| 4,547,551 | 10/1985 | Bailey et al. | 525/240 |
| 4,824,912 | 4/1989 | Su | 525/240 |
| 4,835,219 | 5/1989 | Tajima et al. | 525/240 |
| 4,842,922 | 6/1989 | Krupp et al. | 525/240 |
| 5,013,802 | 5/1991 | Tajima et al. | 526/86 |
| 5,102,955 | 4/1992 | Calabro et al. | 525/240 |

FOREIGN PATENT DOCUMENTS

| | | |
|---|---|---|
| 54-161657 | 12/1979 | Japan. |
| 61-57638 | 3/1986 | Japan. |

*Primary Examiner*—Carman J. Seccuro, Jr.
*Attorney, Agent, or Firm*—Carl D. Corvin

[57] ABSTRACT

A composition of matter comprising: (a) 10 to 80 weight percent inclusive of a low molecular weight polyethylene resin having a density of at least 0.94 grams per cubic centimeter, a melt index greater than 25 grams per 10 minutes, and a heterogeneity index between 2 and 12 inclusive; and (b) 20 to 90 weight percent inclusive of a high molecular weight ethylene copolymer having a density less than 0.955 grams per cubic centimeter, a high load melt index between 2 and 10 grams per 10 minutes inclusive, and a heterogeneity index between 2 and 10 inclusive; wherein said composition of matter has a melt index greater than 0.05 grams per 10 minutes.

20 Claims, No Drawings

POLYETHYLENE BLENDS

CROSS REFERENCE TO RELATED APPLICATION

This patent application is a continuation-in-part of patent application Ser. No. 07/761,603 which was filed on Sept. 18, 1991, now abandoned, the entire disclosure of which is hereby incorporated by reference.

BACKGROUND OF THE INVENTION

This invention relates to polyethylene blends.

Colorless polymeric materials range from being almost totally transparent to being opaque. The opacity is related to the light scattering process occurring within, and at the surface of, the material. Incidental radiation passes through non-absorbing, isotropic, and optically homogenous samples with essentially little loss in radiation intensity. Actually, all polymeric materials scattered light to some extent. The angular distribution of the scattered light is a complex phenomenon because of the scattering due to micromolecular interactions.

Transparency is defined, in general, as a state permitting perception of objects through a sample. In more specific terms, transparency is the amount of undeviated light, that is, the original intensity minus all light absorbed, scattered, or lost through any other means. This scattered light reduces the contrast between light, dark, and other colored parts of objects viewed through the material and produces a milkiness or haze in the transmitted image.

Haze is a measure of the amount of light deviating from the direction of transmittancy of the light by at least 2.5 degrees. In more specific terms, haze is that percentage of transmitted light that in passing through the specimen deviates from the incident beam by forward scattering. In commercial hazemeters, only light deviating more than about 2.5 degrees from the transmitted beam direction is considered haze. The effect of this haze is to impart a cloudy or milky appearance to a sample.

Commercial products are desired that have low haze values. The reasons for wanting such low haze products vary from purely safety purposes to purely marketing purposes. Consequently, methods to produce materials which have low haze values are of great scientific and economic value.

Polyethylene is known as a translucent to opaque white polymer with the opacity increasing with the density. One of the by-products of this is that the haze tends to increase in polyethylene as the density increases. That is, without optically modifying polyethylene, a polyethylene sample which has a density of 0.93 should have a haze value less than a polyethylene sample which has a density of 0.97 when made under similar conditions. However, in many applications it is desirable to use an ethylene polymer which has a high density because of the desirable properties of high density polyethylene. For example, tensile strength, hardness, chemical resistance, and flexural modulus all tend to increase with increasing density. Consequently, providing a polyethylene resin with a low haze value and a high density would be both scientifically and economically valuable.

It is known in the art to blend components with dissimilar characteristics to achieve a blend with superior performance properties. However, this task is not easy to accomplish. For example, the components of a blend can interact antagonistically resulting in a lowering of the expected performance of the blend, or the components can interact producing a blend that is only the mere aggregation of the separate component parts.

Thermoplastic blends are very desirable for applications such as pipes, films, and bottles. However, each application requires a resin tailored for that particular application. Furthermore, each of these tailored resins are judged by many performance attributes. While it is possible to improve one attribute it is often necessary to find a compromise of the various attributes in order to find a resin which fulfills the customer's requirements.

This invention provides an improved compromise of characteristics thereby increasing the availability of possible solutions to consumer demands.

SUMMARY OF THE INVENTION

It is an object of this invention to provide an improved polyethylene blend.

It is another object of this invention to provide a polyethylene blend which has improved optical properties.

It is still another object of this invention to provide a polyethylene blend with improved physical properties.

These and other objects of this invention will become apparent to those skilled in the art from the following detailed description of the invention.

In accordance with this invention, a composition of matter provided comprising: (a) 10 to 80 weight percent inclusive of a low molecular weight polyethylene resin having a density of at least 0.94 grams per cubic centimeter, a melt index greater than 25 grams per 10 minutes, and heterogeneity index between 2 and 12 inclusive; and (b) 20 to 90 weight percent inclusive of a high molecular weight ethylene copolymer having a density less than 0.955 grams per cubic centimeter, a high load melt index between 2 and 10 grams per 10 minutes inclusive, and a heterogeneity index between 2 and 10 inclusive; wherein said composition of matter has a melt index greater than 0.05 grams per 10 minutes.

In another embodiment of this invention a composition of matter provided comprising:

(a) about 10 to about 35 weight percent of a low molecular ethylene homopolymer resin, where said resin is made by polymerizing ethylene with a titanium chloride based catalyst system, and where said resin has a density greater than 0.96 grams per cubic centimeter, a melt index greater than 30 grams per 10 minutes, and a heterogeneity index from 2 to 8, (b) about 65 to about 90 weight percent of a high molecular weight ethylene copolymer resin, where said resin is made by copolymerizing ethylene and an alpha-olefin with a titanium chloride based catalyst system, and where said resin has a density less than about 0.955 grams per cubic centimeter, high load melt index from about 2 to about 6 grams per 10 minutes, and heterogeneity index from about 2 to about 8, wherein said composition of matter has a high load melt index from about 10 to about 25 grams per 10 minutes and is essentially free of other ethylene polymers.

DETAILED DESCRIPTION OF THE INVENTION

The composition of this invention comprises two components. The first component is a low molecular weight polyethylene resin. The second component is a high molecular weight polyethylene resin. Further information concerning the characteristics of these two components are given below.

Polyethylene is a thermoplastic material available in a wide range of flow rates and densities. Polyethylene offers useful properties such as toughness at a variety of temperatures, stiffness ranging from flexible to rigid, as well as excellent chemical resistance. Currently, polyethylene can be fabricated and processed by most known thermoplastic processes in the art.

Polyethylene is generally classified primarily on the basis of two characteristics, namely, density and flow rate (commonly identified as melt index). ASTMD 1248-84 (reapproved 1989) provides a convenient system for categorizing polyethylenes. First, polyethylenes are generally classified according to density: type I polyethylene has a nominal density between 0.910-0.925 grams/cubic centimeter (g/cm$^3$); type II polyethylene has a nominal density between 0.926-0.940 g/cm$^3$; type III polyethylene has a nominal density between 0.941-0.959 g/cm$^3$; and type IV polyethylene has a nominal density of 0.960 g/cm$^3$; or above. Type I polyethylene is usually defined as a low density resin. Type II polyethylene is usually classified as a medium density resin. Type III and IV polyethylenes are usually classified as high density resins.

Within each density type there exists five different categories of flow rates. A category 1 polyethylene has a nominal flow rate greater than 25 g/10 min. at 190° C. and a 2160 gram load. A category 2 polyethylene has a nominal flow rate greater than 10 and up to and including 25 g/10 min. A category 3 polyethylene has a nominal flow rate greater than 1 up to and including 10 g/10min. A category 4 polyethylene has a nominal flow rate greater than 0.4 up to and including 1.0 g/10 min. A category 5 polyethylene has a nominal flow rate equal to or less than 0.4 g/10 min.

These types and categories of polyethylene can be made by various processes known in the art. For example, types I and II polyethylene can be made by a high pressure process which uses oxygen, peroxide and/or other strong oxidizers as a catalyst. Pressures of reaction ranging from 100 to 350 MPa are typically employed. Polyethylene resins formed in these types of processes are highly branched with short side chains occurring every 15 to 40 carbon atoms on the chain backbone. Furthermore, the crystallinity of these types of polyethylene resins is approximately 40 to 60 percent with the amorphous content of the polymer increasing as the density is reduced.

On the other hand, types I, II, III, and IV polyethylene can be produced from such processes as slurry, solution, or gas phase processes. These processes are generally known as low pressure processes. Catalysts used in these processes vary widely, but the most frequently used are transition metals in combination with metal halides or activated metal oxides. Reaction pressures normally fall within 50 to 800 psi. The polyethylene produced by these processes is more linear in nature, that is, little or no long chain branching occurs. Linear polyethylene of types I and II is approximately 50 percent crystalline and types III and IV can be as high as 85 percent crystalline or more. Generally, polyethylene made by the low pressure process with a density below 0.960 is made by polymerizing ethylene with a small amount of comonomer such as propylene, 1-butene and/or 1-hexene.

Catalysts and processes for producing polyethylene are broadly disclosed in U.S. Pat. Nos. 3,887,494; 3,900,451; 4,053,436; 4,151,122; 4,236,988; 4,294,724; 4,347,158; 4,392,990; 4,394,291; and 4,405,501 which are hereby incorporated by reference.

Low Molecular Weight Polyethylene Resin

The low molecular weight polyethylene resin can be any new or recycled ethylene homopolymer or ethylene copolymer. However, it is preferred if the low molecular weight ethylene polymer is a homopolymer. This is because of the better stiffness that can be imparted to the ethylene blend by this ethylene component. Additionally, it is preferred if the low molecular weight ethylene polymer is made by polymerizing ethylene with a titanium chloride based catalyst system. If a comonomer is used, the comonomer generally is an alpha-olefin with about 3 to about 20 carbon atoms per molecule. Preferably, the comonomer has from about 3 to about 10 carbon atoms per molecule and most preferably, from 3 to 8 carbon atoms per molecule. These types of comonomers are preferred due to their cost, availability, and associated properties. Examples of alpha-olefins useful in this invention as comonomers ore propylene, 1-butene, 3-methyl- 1-butene, 1-pentene, 3-methyl-1-pentene, 4-methyl-1-pentene, and 3-ethyl-1-hexene. The amount of comonomer will generally comprise less than about 10 weight percent of the low molecular weight polyethylene resin. Preferably, the low molecular weight polyethylene resin, when employing a comonomer, will comprise from about zero to 4 weight percent comonomer. Generally, the characteristics of the low molecular weight polyethylene resin are those listed below in Table I.

TABLE I

| Low Molecular Weight Polyethylene Resin Characteristics | | | |
|---|---|---|---|
| Characteristic | Broad Range | Preferred Range | Most Preferred Range |
| Density in g/cm$^3$ | D $\geq$ 0.94 | 0.95 $\leq$ D $\leq$ 0.98 | 0.96 $\leq$ D $\leq$ 0.98 |
| Melt Index in g/10 min. at FR-190/2.16 | MI > 25 | 25 < M.I. $\leq$ 800 | 30 $\leq$ M.I. $\leq$ 500 |
| Heterogeneity Index (Mw/Mn)[2] | 2 $\leq$ H.I. $\leq$ 12 | 2 $\leq$ H.I. $\leq$ 10 | 2 $\leq$ H.I. $\leq$ 6 |
| Weight Percent[1] | 10 $\leq$ W.P. $\leq$ 80 | 15 $\leq$ W.P. $\leq$ 70 | 20 $\leq$ W.P. $\leq$ 60 |

[1] Base on the weight of low molecular weight resin + the weight of high molecular weight resin.
[2] The Heterogeneity Index is an indication of the molecular weight distribution. This is a valuable indication of a resin's usefulness in certain applications. It is the weight average molecular weight (Mw) divided by the number average molecular weight (Mn).

In another embodiment of this invention, it is preferred if about 10 to about 35 weight percent of a low molecular weight ethylene homopolymer resin (based on the weight of the low molecular weight resin and the high molecular weight resign), where said resin is made by polymerizing ethylene with a titanium chloride based catalyst system, and where said resin has a density greater than about 0.96 grams per cubic centimeter, a melt index greater than about 30 grams per 10 minutes, and a heterogeneity index from about 2 to about 8, is used. Additionally, it is further preferred if the melt index of the low molecular weight ethylene homopolymer resin is from about 100 to about 400 grams per 10 minutes.

The low molecular weight polyethylene resin generally has a very low environmental stress crack resistance (ESCR).

High Molecular Weight Polyethylene Resin

The high molecular weight polyethylene resin can be any new or recycled ethylene copolymer resin. This is because of the better environmental stress crack resistance that can be imparted to the ethylene blend by this ethylene component. Additionally, it is preferred if the high molecular weight ethylene polymer is made by polymerizing ethylene with a titanium chloride based catalyst system. The comonomer generally is an alpha-olefin with about 3 to about 20 carbon atoms per molecule. Preferably, the comonomer has from about 3 to about 10 carbon atoms per molecule and most preferably, from 3 to 8 carbon atoms per molecule. Examples of alpha-olefins useful in this invention as comonomers are propylene, 1-butene, 3-methyl-1-butene, 1-pentene, 3-methyl-1-pentene, 4-methyl-1-pentene, 1-hexene, and 3-ethyl1-hexene. The amount of comonomer will generally comprise less than about 40 weight percent of the high molecular weight polyethylene resin. Preferably, the high molecular weight polyethylene copolymer will comprise from about 0 to about 30 weight percent incorporated comonomer, and most preferably will comprise from 0.01 to 15 weight percent comonomer. Generally, the properties of the high molecular weight polyethylene resin are those listed below in Table II.

TABLE II

| High Molecular Weight Polyethylene Resin Characteristics | | | |
|---|---|---|---|
| Characteristic | Broad Range | Preferred Range | Most Preferred Range |
| Density in g/cm$^3$ | D < 0.955 | $0.91 \leq D < 0.955$ | $0.915 \leq D < 0.955$ |
| High Load Melt Index in g/10 min. at FR-190/21.60 | $2 \leq$ H.L.M.I. $\leq 10$ | $2 \leq$ H.L.M.I. $\leq 9$ | $2 \leq$ H.L.M.I. $\leq 8$ |
| Heterogeneity Index | $2 \leq$ H.I. $\leq 10$ | $2 \leq$ H.I. $\leq 9$ | $2 \leq$ H.I. $\leq 8$ |
| Weight Percent of Total Polymer | $20 \leq$ W.P. $\leq 90$ | $30 \leq$ W.P. $\leq 85$ | $40 \leq$ W.P. $\leq 80$ |

In another embodiment of this invention, it is preferred if about 65 to about 90 weight percent of a high molecular weight ethylene copolymer resin (based on the weight of the two ethylene components of the blend), where said resin is made by copolymerizing ethylene and an alpha-olefin with a titanium chloride based catalyst system, and where said resin has a density less than about 0.955 grams per cubic centimeter, a high load melt index from about 2 to about 6 grams per 10 minutes, and a heterogeneity index from about 2 to about 8, is used.

In another embodiment of this invention the density of the high molecular weight polyethylene resin is between 0.93 and 0.95 grams per cubic centimeter. The high molecular weight polyethylene resin generally has a very high environmental stress crack resistance. Usually the environmental stress crack resistance of these polymers are so high that they cannot be practically measured.

Blend Characteristics

In general, the properties of the resulting blend of the low molecular weight polyethylene component and the high molecular weight polyethylene component are given in Table III below.

TABLE III

| | Blend Characteristics | | |
|---|---|---|---|
| Characteristic | Broad Range | Preferred Range | Most Preferred Range |
| Density in g/cm$^3$ | $0.94 \leq D \leq 0.98$ | $0.942 \leq D \leq 0.970$ | $0.945 \leq D \leq 0.965$ |
| Melt Index in g/10 min. at FR-190/2.16 | M.I. > 0.05 | $0.1 \leq$ M.I. $\leq 5$ | $0.1 \leq$ M.I. $\leq 2$ |
| Heterogeneity Index | $2 \leq$ H.I. $\leq 20$ | $3 \leq$ H.I. $\leq 15$ | $6 \leq$ H.I. $\leq 12$ |
| Haze Percent | $15 \leq H \leq 42$ | $18 \leq H \leq 40$ | $20 \leq H \leq 38$ |

In another embodiment of this invention, it is preferred if the high load melt index of the polymer blend is from about 10 to about 25 grams per 10 minutes. It is most preferred if the high load melt index is between 10 and 25 grams per 10 minutes for the best overall performance. Additionally, it is preferred if the ratio of the high load melt index to the melt index be less than 60, preferably from about 20 to about 50.

Furthermore, it is preferred, if the composition of matter comprising the ethylene homopolymer resin and the ethylene copolymer resin, is essentially free of any other ethylene polymers. The phrase "essentially free" means for the purposes of this specification that the composition of matter has only trace amounts of other ethylene polymers in its composition as impurities, and/or has only small amounts of ethylene polymers as additives. Generally, these other ethylene polymers, if present, will not substantially change the molecular weight distribution of the composition of matter. For example, if other ethylene polymers are present they will generally be less than 5 weight percent, preferably less than 2 weight percent, and most preferably less than 1 weight percent, of the composition of matter, where the weight percent is based on the total weight of the composition of matter.

Blending of Components

The blending of the components can be accomplished by any method known in the art which produces a homogeneous blend from two polymer resins. Standard polymer processing equipment can be used to make these blends such as, for example, single screw extruders, twin screw extruders, and continuous mixers. Additionally, during blending other components can be added to the blend. These components can be antioxidants, UV stabilizers, preservatives, and processing aids such as fluoroelastomers. In general, "fluoroelastomer" is defined in this specification as any elastomeric polymer containing fluorine. They can be homopolymers or they can be copolymers. Such polymers tend to be amorphous, thermally stable and noncombustible, they also tend to have low glass transition temperatures and are generally resistant to a chemical attack by solvents and chemicals.

EXAMPLES

This example is provided to further assist a person skilled in the art with understanding this invention. The particular reactants, conditions, and the like, are intended to be generally illustrative of this invention and are not meant to be construed as unduly limiting the reasonable scope of this invention.

The following test methods were used to determine the properties of the polyethylene samples.

(1) The density was determined in accordance with ASTMD 1505-85. This is a standard test method for determining the density of plastics. The density is reported in grams per cubic centimeter (D=g/cm$^3$).

(2) The flow rate was determined in accordance with ASTMD 1238-65T. This is a standard test method for determining the flow rate of a thermoplastic. Two different conditions were, used to determine the flow rate. Condition 1 consisted of a temperature of 190° C. and a total load of 2.16 kilograms (FR-190/2.16) which is also called the melt index. Condition 2 consisted of a temperature of 190° C. and a total load weight of 21.60 kilograms (FR-190/21.60) which is also called the high load melt index. The flow rate is reported as the rate of extrusion in grams per 10 minutes (g/10 min.).

(3) The tensile strength at break was determined in accordance with ASTMD 638-90. This is a standard test method for determining the tensile properties of plastics. The tensile strength at break is reported in megapascals (MPa).

(4) The percent elongation at break was determined in accordance with ASTMD 638-90. This is a standard test method for determining the tensile properties of plastics.

(5) The Spencer impact was determined in accordance with ASTMD 3420-85. This is a standard test method for determining the pendulum impact resistance of plastic film. The Spencer impact is reported in Joules (J).

(6) The dart impact was determined in accordance with ASTMD 1709-85. This is a standard test method for determining impact resistance of polyethylene film by the free falling dart method. The dart impact is reported in grams.

(7) The tear resistance was determined in accordance with ASTMD 1922-89. This is a standard test method for determining the propagation tear resistance of plastic film and thin sheeting by the pendulum method. The tear resistance is reported in grams.

(8) The environmental stress crack resistance (ESCR) was determined in accordance with ASTMD 1693-70. This is a standard test method for determining the environmental stress cracking resistance of ethylene plastics. The test specimens were prepared according to ASTMD 1928-80 procedure C. The condition of the test was condition A. The ESCR is reported in hours.

(9) The haze was determined by using a Gardner XL-211 hazeguard/hazemeter system. As stated before, the haze is the amount of transmitted light that in passing through the specimen deviates from the incident beam by forward scattering. Usually, in commercial haze meters only light deviating more than about 2.5° from the transmitted beam direction is considered haze. This device uses a procedure similar to ASTMD 1003-61.

(10) The heterogeneity index (Mw/Mn), which is the weight average molecular weight (Mw) divided by the number average molecular weight (Mn), was determined using data collected by gel permeation chromatography. This gel permeation chromatography was accomplished with a Waters 150C chromatograph at 140° C. using 1,2,4-trichlorobenzene as a solvent. This is a standard test method for determining molecular weight averages and molecular weight distributions.

All resin were made with titanium chloride based catalysts.

Example I

Blends of high and low molecular weight polyethylenes were prepared to demonstrate the properties of the blends of this invention. For each blend, the desired amounts of each polyethylene fluff (total of 260 g of polyethylene) were dry blended in a plastic container. Each polyethylene fluff sample was then mixed with acetone (10 mL/100 g of polyethylene), butylated hydroxytoluene (BHT), dilauryl thiodipropionate (DLTDP), and calcium stearate. The levels of additives in the final blend were 0.05 weight percent BHT, 0.03 weight percent DLTDP, and 0.04 weight percent calcium stearate, with the percentages based on the total polyethylene weight.

After the blends of fluff, acetone, and additives had been mixed by hand in a plastic container, the acetone was allowed to evaporate in a hood and the blend was then dried in a vacuum oven at 70°-80° C. and about 380 mm of mercury vacuum for several hours. The dried blends were then mixed in a Midget Banbury mixer at a temperature between 150°-160° C. for approximately 5 minutes at a mixing speed of 130 rpm and any large pieces were then ground in a mill.

The three high molecular weight and two low molecular weight polyethylenes used to produce the blends are described in Table E-I-A.

TABLE E-I-A

| Polyethylene Blend Resins | | |
|---|---|---|
| High Molecular Weight Polymer Resin | High Load Melt Index g/10 min FR-190/21.60 | Density g/cm$^3$ |
| 1 | 1.0 | 0.9324 |
| 2 | 3.1 | 0.9366 |
| 3 | 6.4 | 0.9378 |
| Low Molecular Weight Polymer Resin | Melt Index g/10 min FR-190/2.16 | Density, g/cm$^3$ |
| 4 | 31 | 0.9676 |
| 5 | 312 | 0.9720 |

Molecular weight information about several of the polymers used in this example is presented in Table E-I-A1. Where the molecular weights were not determined (Polymers 1, 3, and 5), the molecular weights of polymers with similar melt viscosities (Polymers 1A, 3A, and 10) are listed. Polymer 10 is from Example II.

TABLE E-I-A1

| Polyethylene Molecular Weights | | | | |
|---|---|---|---|---|
| Polymer | High Load Melt Index g/10 min | Mw Daltons | Mn Daltons | HI |
| 1A | 1.0 | 315,000 | 60,000 | 5.3 |
| 2 | 3.1 | 208,000 | 46,900 | 4.4 |

TABLE E-I-A1-continued

| Polyethylene Molecular Weights | | | | |
|---|---|---|---|---|
| 3A | 6.0 | 189,000 | 41,900 | 4.5 |

| Polymer | MI, g/10 min | Mw Daltons | Mn Daltons | HI |
|---|---|---|---|---|
| 4 | 31 | 42,700 | 10,700 | 4.0 |
| 10 | 297 | 22,530 | 6,570 | 3.43 |

Nine blends, designated B1 through B9, were prepared. Their components, weight ratios, and properties are listed, in Table E-I-B.

TABLE E-I-B

| Blend | Blend Components High MW/Low MW[a], ratio[b] | Melt Index g/10 min FR-190/2.16 | High Load Melt Index g/10 min FR-190/21.96 | HLMI/MI | Density g/cm$^3$ | Mw Daltons | Mn Daltons | Heterogeneity Index |
|---|---|---|---|---|---|---|---|---|
| B1 | 1/4, 50/50 | 0.26 | 15 | 58 | 0.9519 | 186,000 | 18,000 | 10.4 |
| B2 | 1/4, 60/40 | 0.16 | 7.8 | 49 | 0.9477 | 218,000 | 21,000 | 10.4 |
| B3 | 2/4, 55/45 | 0.54 | 22 | 41 | 0.9524 | 159,000 | 17,100 | 9.3 |
| B4 | 2/4, 65/35 | 0.36 | 13 | 36 | 0.9487 | 166,000 | 19,900 | 8.4 |
| B5 | 3/4, 65/35 | 0.69 | 24 | 35 | 0.9505 | 145,000 | 19,500 | 7.4 |
| B6 | 3/4, 75/25 | 0.48 | 15 | 31 | 0.9471 | 154,000 | 21,100 | 7.3 |
| B7 | 1/5, 65/35 | c | 7.1 | c | 0.9487 | c | c | c |
| B8 | 2/5, 65/35 | c | 17 | c | 0.9512 | c | c | c |
| B9 | 3/5, 65/35 | c | 33 | c | 0.9529 | c | c | c |

[a]Polymer numbers from Table E-I-A.
[b]Weight ratio.
[c]Not determined.

Test specimens were compression molded from the blends and evaluated for properties. The results, summarized in Table E-I-C show the blends exhibit a good balance of properties. Non-blended polyethylene resins with a density of about 0.95 g/cm$^3$ would usually have much lower ESCR values. For example, a polyethylene resin with a density of about 0.952 g/cm and a melt index of about 0.35 g/10 minutes has an environmental stress crack resistance of about 50 hours. This resin just described is available from the Phillips Petroleum Company as HHM 5202.

TABLE E-I-C

| | Physical Properties | | | |
|---|---|---|---|---|
| Blend | Density, g/cm$^3$ | Tensile Break, MPa | Elongation at Break, % | ESCR, hrs |
| B1 | 0.9519 | 36.9 | 1019 | >1000 |
| B2 | 0.9477 | 36.6 | 955 | >1000 |
| B3 | 0.9524 | 34.3 | 1029 | 198 |
| B4 | 0.9487 | 37.1 | 1028 | >1000 |
| B5 | 0.9505 | 34.4 | 1061 | 616 |
| B6 | 0.9471 | 36.5 | 1054 | >1000 |
| B7 | 0.9487 | 36.2 | 934 | >1000 |
| B8 | 0.9512 | 31.9 | 920 | >1000 |
| B9 | 0.9529 | 29.9 | 937 | 451 |

EXAMPLE II

Several more blends of high and low molecular weight polyethylenes were prepared to show that blown films prepared from the blends were clearer than films made from non-blended, commercial, polyethylene blown film resins.

The four high molecular weight and three low molecular weight components for the blends are described in Table E-II-A. Polymer 5 is the same polymer as in Example I.

TABLE E-II-A

| Polyethylene Samples | | |
|---|---|---|
| High Molecular Weight Polymer Resin | High Load Melt Index g/10 min FR-190/21.60 | Density, g/cm$^3$ |
| 6 | 3.1 | 0.9451 |
| 7 | 2.9 | 0.9366 |
| 8 | 3.6 | 0.9474 |
| 9 | 3.0 | 0.9399 |
| Low Molecular Weight Polymer Resin | Melt Index g/10 min FR-190/2.16 | Density, g/cm$^3$ |
| 10 | 297 | 0.9727 |
| 5 | 312 | 0.9720 |
| 11 | 96 | 0.9714 |

Molecular weight information was obtained on only Polymers 10 and 11. This information is shown in Table E-II-A1 along with data for a polymer,

TABLE E-II-A1

| Polyethylene Molecular Weights | | | | | |
|---|---|---|---|---|---|
| Polymer | High Load Melt Index g/10 min FR-190/21.60 | Melt Index g/10 min FR-190/2.16 | Mw Daltons | Mn Daltons | HI |
| 7A | 2.7 | a | 248,000 | 34,900 | 7.1 |
| 10 | a | 297 | 22,530 | 6,570 | 3.43 |
| 11 | a | 96 | 26,500 | 7,400 | 3.6 | a = Not determined.

blends were prepared by mixing the components in a double cone blender with several additives. All polymer blends contained 0.05 weight percent bis(2,4-di-tert-butylphenyl)pentaerythritol diphosphite (Ultranox 626) 0.03 weight percent DLTDP, and 0. 05 weight percent FX 9613 fluoroelastomer from 3M TM. Blend B10 also contained 0.06 weight percent BHT and 0.05 zinc stearate. The other blends also contained 0.02 weight percent BHT and 0. 07 weight percent tetrakis(-methylene 3-(3,5-di-t-butyl-4-hydroxyphenyl)propionate)methane (Irganox 1010).

These blends, designated B10 through B14, were extruded were extruded with melt temperatures of 230°-250° C. into pellets. The resulting resins are described in Table E-II-B with their original components and weight ratios.

TABLE E-II-B

Polyethylene Blends

| Blends | Blend Components High MW/Low MW[a], ratio[b] | Blend High Load Melt Index g/10 min FR-190/21.60 | Blend Density g/cm³ |
|---|---|---|---|
| B10 | 6/10, 66/34 | 15.5 | 0.9579 |
| B11 | 7/5, 67/33 | 15.9 | 0.9585 |
| B12 | 8/5, 60/40 | 32.0 | 0.9613 |
| B13 | 8/11, 60/40 | 26.6 | 0.9603 |
| B14 | 9/5, 67/33 | 17.0 | c |

[a]Polymer numbers from Tables E-I-A and E-II-A.
[b]Weight ratio.
[c]Not determined.

These blends were extruded into blown film about 0.0254 mm thick using a 38 mm single screw extruder with a 50.8 mm film die with a melt temperature of 220°–240° C. for evaluation. Two control groups of polyethylene blown film resins, designated C1 and C2, were included for comparison. Control group resins C1 had a density of about 0.935 g/cm³ and a HLMI of about 15g/10 min. Control group resins C2 had a density of about 0.947 g/cm³ and a HLMI of about 17 g/10 min. Two extruder speeds were used in the film extrusion. Additionally, some of the control resins had 500 part per million by weight of a fluorelastomer. (Viton A ™).

The blown film properties listed in Table E-II-C show that the invention blends B10 through B15 have low haze values compared with the two control films, while retaining good overall film proper'sties and higher densities. With blend B14, an increase in extruder speed from 35 to 75 rpm gave an increase in haze and little change in tear resistance strength. Overall, the blends had a-tear strength and haze value usually associated with lower densities, yet these blends had much higher densities. This combination of high tear strength, lower haze, and higher density was unexpected.

TABLE E-II-C

Film Properties

| Blend | Screw Speed, rpm | Haze, % | Dart Drop, g | Spencer Impact, J | Tear Resistance, g MD/TD,[c] |
|---|---|---|---|---|---|
| B10 | 75 | 30.4 | 166 | 0.44 | 24.8/304 |
| B11[a] | 75 | 32.4 | 128 | 0.41 | b |
|  | 75 | 37.6 | b | b | b |
| B12[a] | 35 | 37.0 | 88 | 0.30 | b |
|  | 35 | 36.1 | b | b | b |
| B13[a] | 35 | 33.0 | 88 | 0.31 | b |
|  | 35 | 31.2 | b | b | b |
| B14 | 35 | 24.6 | 212 | b | 32.3/454 |
|  | 75 | 31.7 | 151 | b | 42.0/331 |
| C1 (Control) | 35[d] | 64.9 | b | b | b |
|  | 75 | 47.8 | 151 | b | 43.0/317 |
|  | 75[d] | 64.4 | b | b | b |
| C2 (Control) | 35[d] | 66.2 | b | b | b |
|  | 75 | 58.2 | 193 | 0.60 | 22.1/408 |
|  | 75 | b | 180 | 0.58 | 17/400 |
|  | 75 | b | 164 | 0.49 | b |
|  | 75[d] | 70.8 | b | b | b |

[a]Variable thickness film.
[b]Not determined.
[c]MD = Machine direction. TD = Transverse direction.
[d]Had fluoroelastomer

EXAMPLE III

Several more blends were made in a manner similar to the manner disclosed in Example II. The results are presented in Table III.

TABLE III

| RESIN | 1E3 | 2E3 | 3E3 | 4E3 | 5E3 |
|---|---|---|---|---|---|
| HMWC[1] |  |  |  |  |  |
| HLMI[2] | 3.1 | 1.0 | 3.1 | 6.4 | 1.0 |
| DENSITY[3] | 0.9366 | 0.9324 | 0.9366 | 0.9378 | 0.9324 |
| LMWC[4] |  |  |  |  |  |
| MI[5] | 312 | 312 | 312 | 312 | 312 |
| DENSITY[3] | 0.9720 | 0.9720 | 0.9720 | 0.9720 | 0.9720 |
| RATIO[6] | 66:34 | 60:40 | 66:34 | 70:30 | 63:37 |
| FLUORO-ELASTOMER | YES | YES | NO | NO | YES |
| BLEND |  |  |  |  |  |
| MI[5] | 0.38 | — | 0.38 | 0.61 | — |
| HLMI[2] | 17.1 | 9.8 | 17.1 | 26.1 | 8.6 |
| DENSITY[3] | 0.9509 | 0.9513 | 0.9509 | 0.9508 | 0.9507 |
| TRANSPARENCY[7] | GOOD | POOR | FAIR | GOOD | POOR |
| PROCESSABILITY[8] | GOOD | POOR | GOOD | POOR | POOR |

[1]This is the high molecular weight ethylene component.
[2]This is the high load melt index in grams per 10 minutes.
[3]This is the density in grams per cubic centimeter.
[4]This is the low molecular weight ethylene component.
[5]This is the melt index in grams per 10 minutes.
[6]This is the weight ratio of the high molecular weight component to the low molecular weight component.
[7]This is observational results of whether items could be viewed through the film.
[8]This is observational data of whether the blend was a stable, easily processable resin.

As can be seen from the above results, resins 1E3 and 3E3 produced the best overall performance in both transparency and processability. Resins 2E3 and 5E3 have poor transparency and poor processability and resin 4E3 has good transparency while having poor processability.

That which is claimed is:

1. A composition of matter comprising:
   (a) about 10 to about 35 weight percent of a low molecular weight ethylene homopolymer resin, where said resin is made by polymerizing ethylene with a titanium chloride based catalyst system, and where said resin has a density greater than about 0.96 grams per cubic centimeter, a melt index greater than about 30 grams per 10 minutes, and a heterogeneity index from about 2 to about 8,
   (b) about 65 to about 90 weight percent of a high molecular weight ethylene copolymer resin, where said resin is made by copolymerizing ethylene and an alpha-olefin with a titanium chloride based catalyst system, and where said resin has a density less than 0.955 grams per cubic centimeter, a high load melt index from about 2 to about 6 grams per 10 minutes, and a heterogeneity index from about 2 to about 8,
   where said weight percents are based on the total weight of said resins (a) and (b); and
   wherein said composition of matter has a high load melt index from about 10 to about 25 grams per 10 minutes, a melt index greater than 0.05 grams per 10 minutes, a density greater than 0.94 grams per cubic centimeter and less than or equal to 0.98 grams per cubic centimeter, and is essentially free of other ethylene polymers.

2. A composition according to claim 1 wherein said melt index of said low molecular weight ethylene homopolymer resin is from about 100 to about 400 grams per 10 minutes.

3. A composition according to claim 1 wherein said alpha-olefin is selected from the group consisting of propylene, 1-butene, 3-methyl-1-butene, 1-pentene, 3-methyl-1-penetene, 4-penetene, 1-hexene, 3-ethyl-1-hexene, and mixtures of two or more said alpha-olefins.

4. A composition according to claim 1 wherein said copolymer has a density from about 0.93 to about 0.95 grams per cubic centimeter.

5. A composition according to claim 1 wherein said high load melt index of said composition is between 10 and 25 grams per 10 minutes.

6. A composition of matter comprising:
(a) about 10 to about 35 weight percent of a low molecular weight ethylene homopolymer resin, where said resin is made by polymerizing ethylene with a titanium chloride based catalyst system, and where said resin has a density greater than 0.96 grams per cubic centimeter, a melt index greater than 30 grams per 10 minutes, and a heterogeneity index from 2 to 8,
(b) about 65 to about 90 weight percent of a high molecular weight ethylene copolymer resin, wherein said resin is made by copolymerizing ethylene and an alpha-olefin with a titanium chloride based catalyst system, and where said resin has a density less than 0.955 grams per cubic centimeter, a high load melt index from about 2 to about 6 grams per 10 minutes, and a heterogeneity index from about 2 to about 8,
where said weight percent are based on the total weight of said resins (a) and (b); and
wherein said composition of matter has a high load melt index from about 10 to about 25 grams per 10 minutes, a melt greater than 0.05 grams per 10 minutes, a density greater than 0.94 grams per cubic centimeter and less than or equal to 0.98 grams per cubic centimeter, and is essentially free of other ethylene polymers.

7. A composition of matter according to claim 6 wherein said melt index of said low molecular weight ethylene homopolymer resin is from about 100 to about 400 grams per 10 minutes.

8. A composition of matter according to claim 6 wherein said alpha-olefin is selected from the group consisting of propylene, 1-butene, 3-methyl-1-butene, 1-pentene, 3-methyl-1-pentene, 4-methyl-1-pentene, 1-hexene, 3-ethyl-1-hexene, and mixtures of two or more said alpha-olefins.

9. A composition of matter according to claim 6 wherein said copolymer has a density from about 0.93 to about 0.95 grams per cubic centimeter.

10. A composition of matter according to claim 6 wherein said high load melt index of said composition is between 10 and 25 grams per 10 minutes.

11. A composition of matter according to claim 1 wherein said composition of matter has a density greater than or equal to 0.942 grams per cubic centimeter and less than or equal to 0.98 grams per cubic centimeter.

12. A composition of matter according to claim 1 wherein said composition of matter has a density greater than or equal to 0.945 grams per cubic centimeter and less than or equal 0.98 grams per cubic centimeter.

13. A composition of matter according to claim 1 wherein said composition of matter has a melt index greater than or equal to 0.1 grams per 10 minutes.

14. A composition of matter according to claim 1 wherein said composition of matter has a melt index greater than or equal to 0.1 grams per 10 minutes and less than or equal to 5 grams per 10 minutes.

15. A composition of matter according to claim 6 wherein said composition of matter has a density greater than or equal to 0.942 grams per cubic centimeter and less than or equal 0.98 grams per cubic centimeter.

16. A composition of matter according to claim 6 wherein said composition of matter has density greater than or equal to 0.945 grams per cubic centimeter and less than or equal 0.98 grams per cubic centimeter.

17. A composition of matter according to claim 6 wherein said composition of matter has a index greater than or equal to 0.1 grams per 10 minutes.

18. A composition of matter according to claim 6 wherein said composition of matter has a melt index greater than or equal to 0.1 grams per 10 minutes and less than or equal to 5 grams per 10 minutes.

19. A composition according to claim 1 wherein said composition of matter has a density than or equal to 0.945 grams per cubic centimeter and less than or equal to 0.98 grams per cubic centimeter, and a melt index greater than or equal to 0.1 grams per 10 minutes and less than 5 grams per minutes.

20. A composition according to claim 6 wherein said composition of matter has density greater than or equal to 0.945 grams per cubic centimeter and less than or equal to 0.98 grams per cubic centimeter, and a melt index greater than or equal to 0.1 grams per 10 minutes and less than 5 grams per minutes.

* * * * *

UNITED STATES PATENT AND TRADEMARK OFFICE
CERTIFICATE OF CORRECTION

PATENT NO. : 5,380,803
DATED : January 10, 1995
INVENTOR(S) : Coutant et al

It is certified that error appears in the above-indentified patent and that said Letters Patent is hereby corrected as shown below:

Column 12, line 67, "methyl-1-pentene, 4-pentene" should read ---methyl-1-pentene, 4-methyl-1-pentene---.
Column 13, line 18, "wherein" should read ---where---.
Column 13, line 25, "percent" should read ---percents---.
Column 13, line 29, after "melt" insert ---index---.
Column 14, line 31, after "a" insert ---melt---.
Column 14, line 38, after "density" insert ---greater---.
Column 14, line 42, after "per" insert ---10---.
Column 14, line 44, after "has" insert ---a---.
Column 14, line 48, after "per" insert ---10---.

Signed and Sealed this

Ninth Day of April, 1996

Attest:

BRUCE LEHMAN

*Attesting Officer*  *Commissioner of Patents and Trademarks*